United States Patent
Muccini et al.

(10) Patent No.: US 11,281,275 B2
(45) Date of Patent: Mar. 22, 2022

(54) SYSTEM AND METHOD FOR USING INPUT POWER LINE TELEMETRY IN AN INFORMATION HANDLING SYSTEM

(71) Applicant: DELL PRODUCTS, LP, Round Rock, TX (US)

(72) Inventors: Mark A. Muccini, Georgetown, TX (US); John Erven Jenne, Austin, TX (US); Wayne Kenneth Cook, Round Rock, TX (US); Wade Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 16/598,531

(22) Filed: Oct. 10, 2019

(65) Prior Publication Data

US 2021/0109582 A1 Apr. 15, 2021

(51) Int. Cl.
| | |
|---|---|
| G06F 1/28 | (2006.01) |
| G06F 1/30 | (2006.01) |
| G06F 1/3296 | (2019.01) |
| G06F 1/3234 | (2019.01) |

(52) U.S. Cl.
CPC .............. *G06F 1/28* (2013.01); *G06F 1/305* (2013.01); *G06F 1/3243* (2013.01); *G06F 1/3296* (2013.01)

(58) Field of Classification Search
CPC .................................. G06F 1/28; G06F 1/305
See application file for complete search history.

(56) References Cited

U.S. PATENT DOCUMENTS

| | | | |
|---|---|---|---|
| 7,613,861 B2 | 11/2009 | Rangarajan et al. | |
| 7,721,034 B2 | 5/2010 | Wang et al. | |
| 9,130,659 B2 | 9/2015 | Nii et al. | |
| 9,971,605 B2 | 5/2018 | Henry et al. | |
| 2005/0235174 A1* | 10/2005 | Curt | H02J 13/0075 713/340 |
| 2008/0189315 A1* | 8/2008 | Shih | G06F 11/3089 |
| 2008/0222435 A1* | 9/2008 | Bolan | G06F 1/3203 713/310 |
| 2011/0245988 A1* | 10/2011 | Ingels | H02J 3/14 700/295 |
| 2012/0089854 A1* | 4/2012 | Breakstone | G06F 3/0625 713/323 |
| 2015/0032784 A1* | 1/2015 | Hu | G06F 16/182 707/827 |
| 2016/0238478 A1* | 8/2016 | Bizub | F02D 35/027 |
| 2016/0306402 A1* | 10/2016 | Huang | G06F 1/3253 |
| 2019/0317580 A1* | 10/2019 | Yang | H02J 3/26 |
| 2021/0018542 A1* | 1/2021 | Bates | G01R 31/343 |

* cited by examiner

*Primary Examiner* — Mark A Connolly
(74) *Attorney, Agent, or Firm* — Larson Newman, LLP

(57) ABSTRACT

An information handling system includes a power supply and a baseboard management controller (BMC). The power supply includes an input power monitor module and a communication interface. The input power monitor module is configured to detect a total harmonic distortion (THD) on a power input to the power supply, to determine that the THD is greater than a THD threshold, and to provide an indication that the THD is greater than the THD threshold on the communication interface. The BMC is coupled to the communication interface, and is configured to receive the first indication and to enter an item into a log of the information handling system in response to receiving the indication.

16 Claims, 4 Drawing Sheets

SYSTEM AND METHOD FOR USING INPUT POWER LINE TELEMETRY IN AN INFORMATION HANDLING SYSTEM

FIELD OF THE DISCLOSURE

This disclosure generally relates to information handling systems, and more particularly relates to a system and method for using input power line telemetry in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a power supply and a baseboard management controller. The power supply may include an input power monitor module and a communication interface. The input power monitor module may be configured to detect a total harmonic distortion (THD) on a power input to the power supply, to determine that the THD is greater than a THD threshold, and to provide an indication that the THD is greater than the THD threshold on the communication interface. The BMC may be coupled to the communication interface, and may be configured to receive the first indication and to enter an item into a log of the information handling system in response to receiving the indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
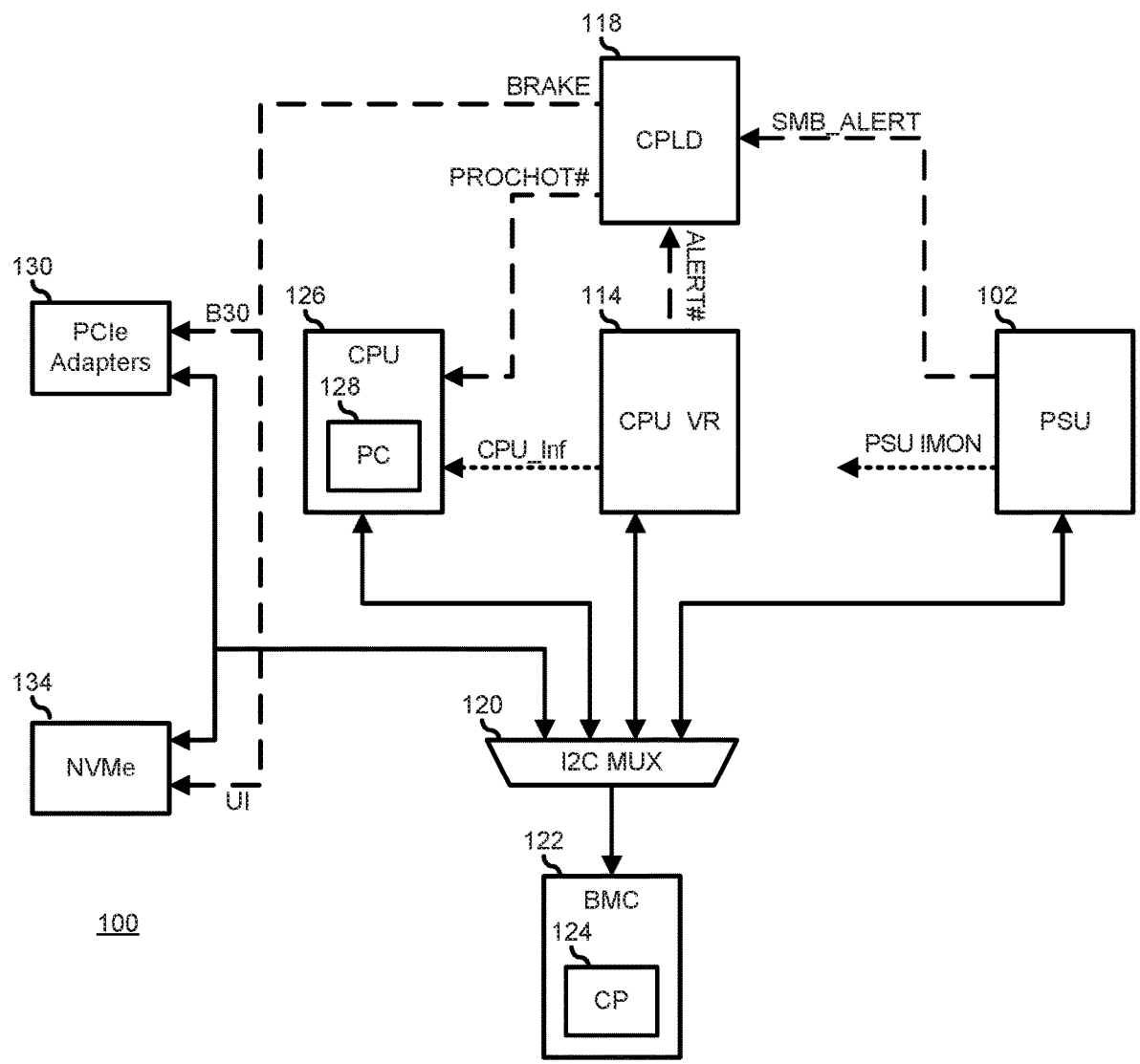
FIG. 1 is a block diagram of a power control system for an information handling system according to an embodiment of the present disclosure.
Figure 2:
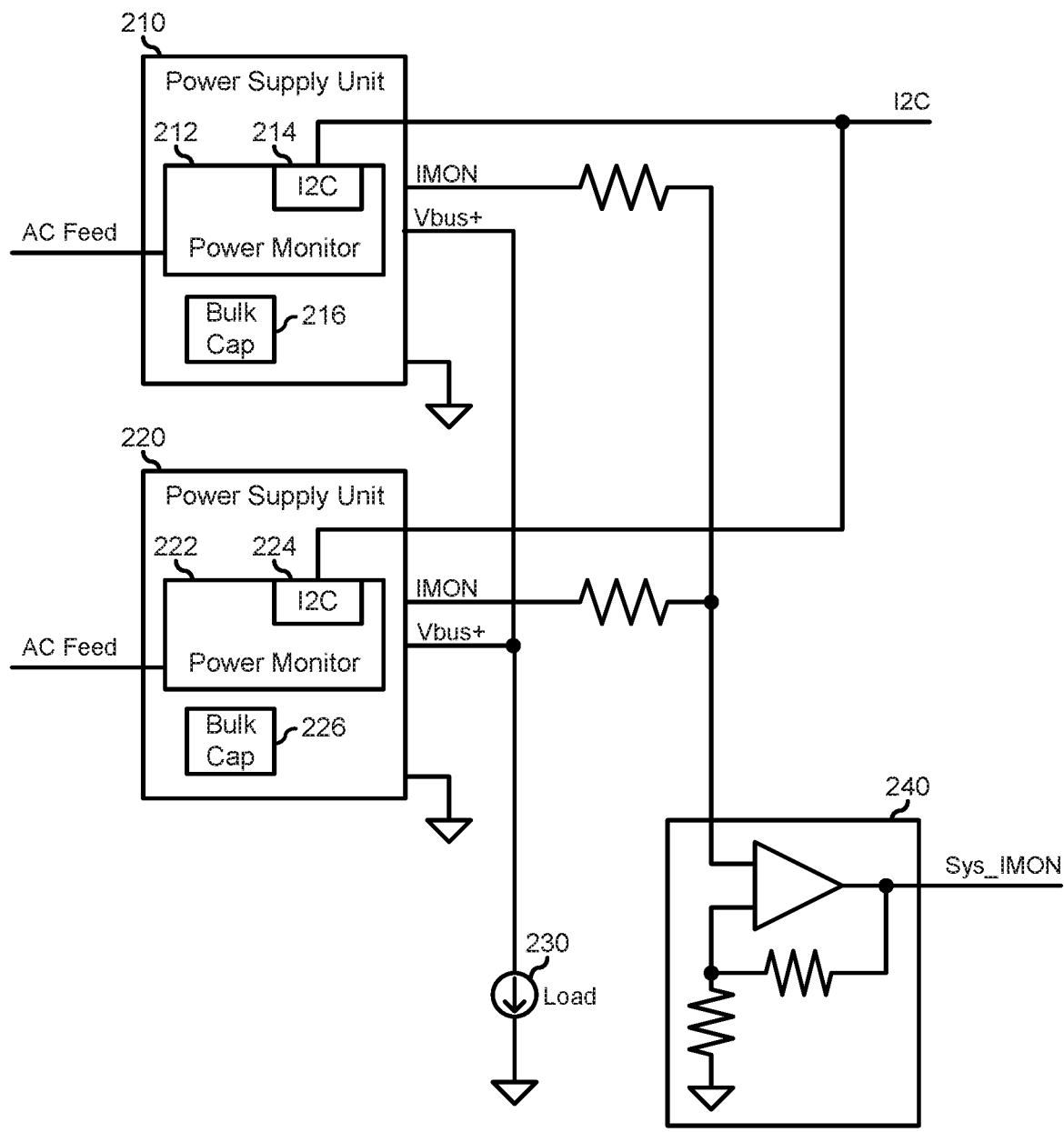
FIG. 2 is a block diagram of a power supply system for an information handling system according to an embodiment of the present disclosure.

FIG. 1 illustrates a power control system 100 for an information handling system. Power control system 100 includes one or more PSU 102, one or more CPU VR 114, a complex programmable logic device (CPLD) 118, an Inter-Integrated Circuit (I2C) interface multiplexor (I2C MUX) 120, a baseboard management controller (BMC) 122, one or more CPU 128, one or more PCIe adapter 130, another system current monitor splitter 132, and one or more Non-Volatile Memory Express (NVMe) interface 134. It will be understood that power control system 100 is representative of the various monitoring, management, and control aspects of an overall power system for an information handling system, and that FIG. 1 is not intended to show the actual power distribution network of the subject information handling system. A simplified power supply system is shown in FIG. 2, as described further, below.

PSU 102 represents a switching power converter device that receives input power (typically an alternating current (AC) power line input) and provides one or more output voltage rails (typically direct current power rails). PSU 102 is configurable to operate in various operating modes, such as a standby mode, a normal power mode, and a constant current mode. Further, based upon various platform power states enacted on the information handling system, one or more of the voltage rails may be powered on while other power rails are powered off. As such, PSU 102 includes an I2C interface that is connected via I2C MUX 120 to BMC 122 and that permits the communication of various status and configuration information to the BMC and the receipt of various control information from the BMC, as described further below. In addition, PSU 102 provides various hardware status signals to power control system 100. Such hardware status signals may include various bi-state signals, such as an over-current warning (OCW), a power-ok signal (POK), a constant current (CC) signal, an input voltage status (Vin_Good) signal, a System Management Bus (SMB) alert (SMB_ALERT) signal, or other bi-state status signals, as needed or desired. The hardware status signals may also include various analog signals such as a PSU current level (PSU_IMON) signal, or other analog signals, as needed or desired. The SMB_ALERT signal is provided to CPLD 118 in response to an OCW signal from PSU 102.

CPLD 118 represents a programmable device that provides various logic functions for the information handling system that utilizes power control system 100. In particular, CPLD 118 includes multiple general purpose I/O (GPIOs) and is programmed to provide various relations between the signals received on the GPIOs and the signals provided on the GPIOs. As such, CPLD 118 is configured to receive the SMB_ALERT signal from PSU 102, and the ALERT# signal from CPU VR 118. CPLD 118 is further configured to provide a processor over-temperature signal (PROCHOT#) to CPU 126 and power brake (BRAKE) signals to PCIe adapter 130 (B30), and NVMe interface 134 (UI), as described further below.

PCIe adapter 130 represents one or more PCIe root ports and endpoint devices of the information handling system that includes power control system 100. PCI adapter 130 conditions its power profile based upon a Sys_IMON signal. For example, PCIe adapter 130 can determine that PSU 102 is providing less than a fully rated power level to the information handling system, and in response, the PCIe adapter can increase its performance, thereby utilizing more of the power capacity of PSU 102. In another example, PCIe adapter 130 can determine that PSU 102 is providing at or near the fully rated power level to the information handling system, and in response, the PCIe adapter can decrease its performance, thereby reducing the power utilization of PSU 102. PCIe adapter 130 further includes an I2C interface that is connected via I2C MUX 120 to BMC 122 and that permits the communication of various status and configuration information to the BMC and the receipt of various control information from the BMC, as described further below. It will be understood that PCIe adapter 130 may represent two or more PCIe adapters that each receive a separate Sys_IMON signal from Sys_IMON splitter 132, as needed or desired.

NVMe interface 134 represents one or more non-volatile memory controller of the information handling system that includes power control system 100. NVMe interface 134 can determine that PSU 102 is providing less than a fully rated power level to the information handling system, and in response, the NVMe interface can increase its performance, thereby utilizing more of the power capacity of PSU 102. In another example, NVMe interface 134 can determine that PSU 102 is providing at or near the fully rated power level to the information handling system, and in response, the NVMe interface can decrease its performance, thereby reducing the power utilization of PSU 102. NVMe interface 130 further includes an I2C interface that is connected via I2C MUX 120 to BMC 122 and that permits the communication of various status and configuration information to the BMC and the receipt of various control information from the BMC, as described further below. It will be understood that NVMe interface 134 may represent two or more NVMe interfaces that each receive a separate Sys_IMON signal from Sys_IMON splitter 132, as needed or desired. It will be further understood that the I2C interface of NVMe interface may share a common I2C bus with the I2C interface of PCIe adapter 130. Further, it will be understood that power management system 100 may include one or more additional subsystem, such as a network interface device (NIC), a storage adapter, or another subsystem of an information handling system that may receive the Sys_IMON signal and adapt the performance of the subsystem accordingly, as needed or desired.

I2C MUX 120 operates to multiplex I2C busses from PSU 104, CPU VR 114, CPU 126, PCIe adapters 130, and NVMe interface 134 to an I2C interface of BMC 122. Here, BMC 122 operates to monitor, manage, and maintain the operations of PSU 104, CPU VR 114, CPU 126, PCIe adapters 130, and NVMe interface 134 via communications over the various I2C busses. In particular, BMC 122 may include a processor that runs management code to perform the functions of the BMC, and may further include a co-processor that, under the direction of the management code, offloads the BMC processor from various repetitive tasks, such as I2C service routines. It will be understood that the configuration of the I2C busses and I2C MUX 120 are exemplary, and that the information handling system that utilizes power control system 100 may employ an I2C bus configuration that is different than the one shown herein. Moreover, it will be understood that the communications between BMC 122 and PSU 104, CPU VR 114, CPU 126, PCIe adapters 130, and NVMe interface 134 may be via other communication standards, as needed or desired. For example, the communication between BMC 122 and CPU 126 may be channeled via an I2C bus to a Platform Controller Hub (PCH) that is in communication with the CPU, or the BMC may communicate directly with the CPU via a Platform Environment Control Interface (PECI), as needed or desired.

In operation, power control system 100 provides three mechanisms for controlling the flow of power to the loads of the information handling system that includes the power control system: a hardware protection mechanism as shown by the dashed signal lines, a fast firmware control loop as shown by the dotted signal lines, and a slow firmware control loop as shown by the solid signal lines. The hardware control mechanism is the fastest control mechanism and is primarily controlled by CPLD 118. Further, the hardware control mechanism provides a coarsest response, such as by applying a maximum throttling to the operations of the information handling system, and thus degrades performance more that the fast or slow firmware control loops. Here, CPLD 118 receives the SMB_ALERT signal from PSU 102 and the ALERT# signal from CPU VR 114. These signals each provide an indication that the respective sending element is in a critical load condition. For PSU 102 and CPU VR 116, the critical load conditions represent the fact that the PSU or the CPU VR are at a maximum loading and can supply no further current to their respective loads, leading to a potential voltage drop on one or more of their power rails. When CPLD 118 receives one or more of the critical load condition signals, the CPLD provides the PROCHOT# signal to CPU 126. In response, CPU 126 takes actions to lower the power consumption of the CPU, such as by lowering a performance state of the CPU by lowering an operating frequency or an operating voltage of the CPU, or shutting down internal units of the CPU, as needed or desired. CPLD 118 further responds to one or more of the critical load condition signals by providing the BRAKE signal to PCIe adapter 130 and NVMe interface 134. In response, PCIe adapter 130 and NVMe interface 134 take actions to lower their power consumption. The particular steps taken by a CPU, a PCIe adapter or device, or a NVMe interface to lower their respective power consumption are known in the art and are beyond the scope of the present disclosure, and will be described no further herein except as needed to further describe the present embodiments. Note that other hardware power control signals may be provided in a typical information handling system and that may make up other functions of the hardware protection mechanism. For example, a particular architecture may include a MEMHOT# or EVENT# signal for memory components. Other hardware based power control signals may be provided on other architectures, and such signals will be understood to be included in a hardware protection mechanism, as needed or desired. Further, the distinction between the hardware protection mechanism and the fast and slow firmware control loops is not intended to be exclusive. For example, a CPLD may further operate in response to a critical load condition to provide an interrupt to a BMC, and the BMC may then apply specific firmware-based controls in response.

The fast firmware control loop consists of the PSU_I-MON signal and a distributed Sys_IMON signals. Here, CPU VR 114, PCIe adapter 130, and NVMe interface 134 respond to variations in the system current level, as indicated by the Sys_IMON signal, as described above. The slow firmware control loop consists primarily of the I2C interfaces, through which BMC 122 operates to monitor, manage, and maintain PSU 102, CPU VR 114, CPU 126, PCIe adapter 130, and NVMe interface 134. The slow firmware control loop provides different regulation schemes in different platform load states, such as during emergency power-down conditions, or other load conditions or system operating states as needed or desired.

FIG. 2 illustrates a power supply system 200 including PSUs 210 and 220, a load 230, and a current reference 240. Power supply system 200 operates to provide various regulated power rails as may be needed by an information handling system, such as information handling system 100. PSUs 210 and 220 each include an AC power feed to receive power from a power distribution system, and operate to provide one or more regulated output voltage (Vbus+) to load 230. PSUs 210 and 220 also each provide a PSU_I-MON signal that indicates the amount of current being supplied by the respective PSU. The PSU_IMON signals are current-level signals that are proportional to the current supplied by the respective PSUs. The PSU_IMON signals are summed and provided as an input to current reference 240 that provides a Sys_IMON signal output. In a particular embodiment, the Sys_IMON signal is the average of the individual PSU_IMON signals. It will be noted that PSUs 210 and 220 typically provide power on two or more voltage rails at different voltage levels supply different sub-systems of the information handling system that includes power supply system 200. In a particular embodiment, power supply system 200 includes separate current references similar to current reference 240.

PSU 210 includes a power monitor module 212 and a bulk capacitor 216. Power monitor module 212 includes an I2C interface 214, and operates to detect input conditions on the AC feed to PSU 210 and on bulk capacitor 216, and to provide alerts to the information handling system via I2C interface 214 when the input conditions exhibit poor quality. Similarly, PSU 220 includes a power monitor module 222 and a bulk capacitor 226. Power monitor module 222 includes an I2C interface 224, and operates to detect input conditions on the AC feed to PSU 220 and on bulk capacitor 226, and to provide alerts to the information handling system via I2C interface 224 when the input conditions exhibit poor quality.

It has been observed by the inventors of the present disclosure that poor input power quality on an AC feed if a PSU may cause problems in the information handling system that are otherwise difficult to debug. In particular, problems such as inconsistent continuity of service (brownouts and blackouts), variations in voltage magnitude, transient voltages and currents, harmonic content in the waveforms on the AC feed, and the like, can cause problems on the information handling system such as the PSUs operating at an unacceptably low power factor, increased input current draw, reduced PSU operating efficiency, or the like. Such problems exhibited by the PSUs may trigger reduced performance by the information handling system, such as reduced up-time, increased recovery time after a save operation on information handling systems with persistent memory configurations, increased charge times for auxiliary power sources for persistent memory solutions, and the like. In particular, the total harmonic distortion on an AC feed may be particularly disruptive to the information handling system, but the total harmonic distortion on an AC feed is not typically monitored by a power supply monitor of a PSU.

Increases in the total harmonic distortion on an AC feed my also affect the broader datacenter through recycling losses in an uninterruptable power supply (UPS), in transformers, and in other items on the power grid. In particular, it will be understood that increases in the total harmonic distortion on an AC feed may increase the amount of neutral currents on the AC feed and cause transformers to saturate, bringing portions of the data center down. Of particular concern are the triplen harmonics, defined as the odd multiples of the 3rd harmonics (e.g., 3rd, 9th, 15th, etc.), which have a direct impact on the neutral current and are additive to any present phase imbalance between phases of the AC feed. Further as the load imbalance becomes larger, the neutral and phase currents increase, because the currents associated with the triplen harmonics are in phase with the AC feed. Thus, for example, a 10% triplen current in combination with a 10% load imbalance more than doubles the magnitude of the neutral current.

In a particular embodiment, power monitor modules 212 and 222 operate to detect the input conditions on the AC feed to respective PSUs 210 and 220 and bulk capacitors 216 and 226, and to provide alerts to the information handling system via I2C interfaces 212 and 224 when the input conditions exhibit poor quality. Power monitor modules 210 and 220 monitor power conditions such as inconsistent continuity of service (brownouts and blackouts), variations in voltage magnitude, transient voltages and currents, harmonic content in the waveforms on the AC feed, and the like. In particular, power monitor modules 210 and 220 include signal processing circuits that operate to detect and characterize the THD on the AC feed. Then, when the THD on the AC feed exceeds a one or more THD threshold, power monitor modules 210 and 220 operate to provide indications to the information handling system via I2C interfaces 214 and 224. Here, power monitor modules 210 and 220 may implement multiple THD thresholds, such as a 5% THD threshold, a 10% THD threshold, a 15% THD threshold, and other THD thresholds, as needed or desired. Here, when the THD on the AC feed exceeds 5%, power monitor modules 210 and 220 will provide a warning indication that the THD is increasing, but is not at an alert level. When the THD on the AC feed exceeds 10%, power monitor modules 210 and 220 will provide a warning indication that the THD has increased beyond the warning level to the alert level. Finally, when the THD on the AC feed exceeds 15%, power monitor modules 210 and 220 will provide a critical indication that the THD is above the critical level. Detection circuits for detecting input conditions on an AC feed are known in the art and are beyond the scope of the present disclosure, and will be described no further herein except as needed to further describe the present embodiments.

Further, power monitor modules 210 and 220 include signal processing circuits that operate to detect and characterize when a charging rate of one or more of bulk capacitors 216 and 226 is lower than the load current provided to the information handling system on the associated output. Here, for example, transient loads may be expected draw current from the bulk capacitor, as evidenced by a decrease in the voltage across the bulk capacitor. However, a sufficient charge is expected to be maintained on the bulk capacitor to meet PSU Ride Through and Hold-up requirements of the information handling system. If the bulk capacitor energy level drops below one or more reserved energy threshold, it may be an indicator that the bulk capacitor charge rate is lower than expected due to AC feed availability issues. Then, when the charge rate on one or more of bulk capacitors 216 and 226 is lower than the load current provided to the information handling system on the associated output, power monitor modules 210 and 220 operate to provide indications to the information handling system via I2C interfaces 214 and 224. Here, power monitor modules 210 and 220 may implement multiple thresholds related to the charge rates on the bulk capacitors and the differences between the charge rate and the load. For example, power monitor modules 212 and 222 may implement one or more charge rate threshold, such that if the charge rate on one or more of bulk capacitors 216 and 226 exceed a first threshold, power monitor modules 210 and 220 will provide a warning indication that the charge rate is high, but is not at an alert level. Further, when the charge rate exceeds a second threshold, power monitor modules 210 and 220 will provide a warning indication that the charge rate has increased beyond the warning level to the alert level. Finally, when the charge rate exceeds a third threshold, power monitor modules 210 and 220 will provide a critical indication that the charge rate is above the critical level. Exemplary charge rate thresholds may be determined as needed or desired in a particular information handling system based upon the design of power system 200. Detection circuits for detecting and characterizing when a charging rate of a bulk capacitor is lower than a load current are known in the art and are beyond the scope of the present disclosure, and will be described no further herein except as needed to further describe the present embodiments.

In another example, power monitor modules 212 and 222 may implement one or more difference threshold, such that if the charge rate on one or more of bulk capacitors 216 and 226 is lower than the load current for longer than a first duration threshold, power monitor modules 210 and 220 will provide a warning indication that the duration of the difference is high, but is not at an alert level. Further, when a second duration threshold is exceeded, power monitor modules 210 and 220 will provide a warning indication that the duration of the difference has increased beyond the warning level to the alert level. Finally, when a third duration threshold is exceeded, power monitor modules 210 and 220 will provide a critical indication that the duration of the difference is above the critical level. Exemplary charge difference thresholds may be determined as needed or desired in a particular information handling system based upon the design of power system 200. In a particular embodiment, PSUs 210 and 220 operate to provide more or less threshold levels. In another embodiment, the threshold levels may be programmable, such as by receiving the threshold levels via respective I2C interfaces 214 and 224.

Returning to FIG. 1, in a particular embodiment, PSU 102 is similar to PSUs 210 and 220, operating to detect the input conditions on the AC feed and on bulk capacitors of the PSU, and providing alerts to the BMC 122 via the I2C interface when the input conditions exhibit poor quality. In response, BMC 122 operates to trigger various responses on power control system 100 and on the associated information handling system. In a particular embodiment, BMC 122 operates to receive indications of poor input power quality, such as warning indications, alert indications, and critical indications, from PSU 102, and to log the indication in a system event log managed by the BMC. Here, the system event log can be maintained by a hosted environment of the information handling system, by the BMC in a non-volatile memory associated with the BMC, in an event manager of a management system for a data center that includes the information handling system, or in a combination thereof.

Further, BMC 122 operates to correlate indications of poor input power quality with other power management functions of the information handling system and of power control system 100. For example, BMC 122 can operate to receive a warning indication from PSU 102, and can operate to mask other power quality indications, such as hardware indications from the PSU indicating an input power fault. Here, a typical operation of power control system 100 may include receiving an input power fault indication from PSU 102 or detecting the assertion of the SMB_ALERT signal from the PSU. Here, BMC 122 may operate to communicate back to PSU 102 via the I2C interface to withhold the assertion of the SMB_ALERT signal while the input power quality issue remains at the warning level, or the BMC may provide an input to CPLD 118 that operates to mask the SMB_ALERT to the CPLD until either an indication from PSU 102 of a higher level power quality issue is received by the BMC, or an indication from the PSU that the input power quality issue has subsided. In this way, BMC 122 operates to filter out hardware faults that would tend to unnecessarily exercise the throttling functions of power control system 100, permitting the power control system to ride through minor input power quality issues. Additionally, BMC 122 operates to provide indications to a user of the information handling system that poor input power quality issues may be responsible for throttling events or other impacts to system performance.

As noted above, power control system 100 may include two or more PSUs similar to PSU 102. Here, in a typical operating mode, one or more PSU is active while one or more PSU is held as a hot-spare. Here, when the active PSU suffers a fault, the hot-spare can quickly be brought on line to maintain good power for the information handling system. In a particular embodiment, when BMC 122 receives an indication of an input power quality issue, the BMC brings up one or more of the hot-spare PSUs in order to ensure that the input power quality issue does not affect the performance of the information handling system. Here, it will be understood that one or more hot-spare PSU may be powered by the same AC feed, or by a different AC feed, such as a different phase. Here, bringing up the hot-spare, the input power quality issue may not exist on the AC feed of the hot-spare PSU, or the presence of two or more active PSUs may permit the overall power supply to more readily ride through the poor input power quality issues. When BMC 122 brings up one or more of the hot-spare PSUs, the BMC further provides an indication that the hot-spare PSUs have been activated, and that the hot-spare PSUs are not otherwise available in case of failure of a PSU. The indication may be provided to one or more of the hosted environment of the information handling system, to a log maintained by BMC 122, and to a management system of a data center that includes the information handling system.

In a particular embodiment, the information handling system includes various persistent memory architectures. Here, when BMC 122 receives an indication of an input power quality issue, the BMC operates to trigger a persistent memory SAVE operation to direct the persistent memory to store the contents of volatile memory elements to their associated non-volatile memory elements in anticipation of a complete loss of power on the information handling system. Here, while the input power quality may otherwise be insufficient to trigger a persistent memory SAVE operation, for example, because the input power quality issue is not sufficiently poor to cause PSU 102 to withdraw a POWER_OK signal or a Vin_GOOD signal, the input power quality may be sufficiently bad to cause the charge on the bulk capacitor of the PSU to be reduced to a level that is insufficient to sustain the voltage on the power rails for a long enough duration to perform the persistent memory SAVE operation. For example, where a persistent memory architecture includes 3D Xpoint memory, a power supply may be expected to provide sufficient voltage on the power rails for up to 2 milliseconds (ms) after the loss of the POWER_OK or Vin_GOOD signals. In another example, where a persistent memory architecture includes N-type non-volatile DIMMs (NV-DIMM-Ns), a power supply may be expected to provide sufficient voltage for 4 ms before the loss of the POWER_OK signal to permit the a backup power supply or battery to provide an output voltage, and so the information handling system may typically rely on the deassertion of the Vin_GOOD signal to trigger the backup power supply or battery to come on line. Here, BMC 122 substitutes an indication that the bulk capacitor charge on PSU 102 is lower than a persistent memory SAVE operation level, and triggers the backup power supply or battery to come on line without the deassertion of the Vin_GOOD signal.

In another embodiment, the information handling system implements a throttling policy for various power conditions detected on power control system 100. Here, when BMC 122 receives an indication of an input power quality issue, the BMC operates to trigger the throttling policy in order to reduce the load on drawn by the information handling system in order to permit the bulk capacitor of PSU 102 adequate opportunity to recharge to handle a full load on the information handling system.

In another embodiment, PSU 102 can utilize various power line communications schemes as are known in the art. Here, poor input power quality may lead to poor power line communications performance. As such, when BMC 122 receives an indication of an input power quality issue, the BMC operates to ensure more reliable power line communications by, for example, directing the PSU to provide higher signal voltages, to reduce a communication bandwidth, or the like, as needed or desired to improve the power line communications performance.

Figure 3:
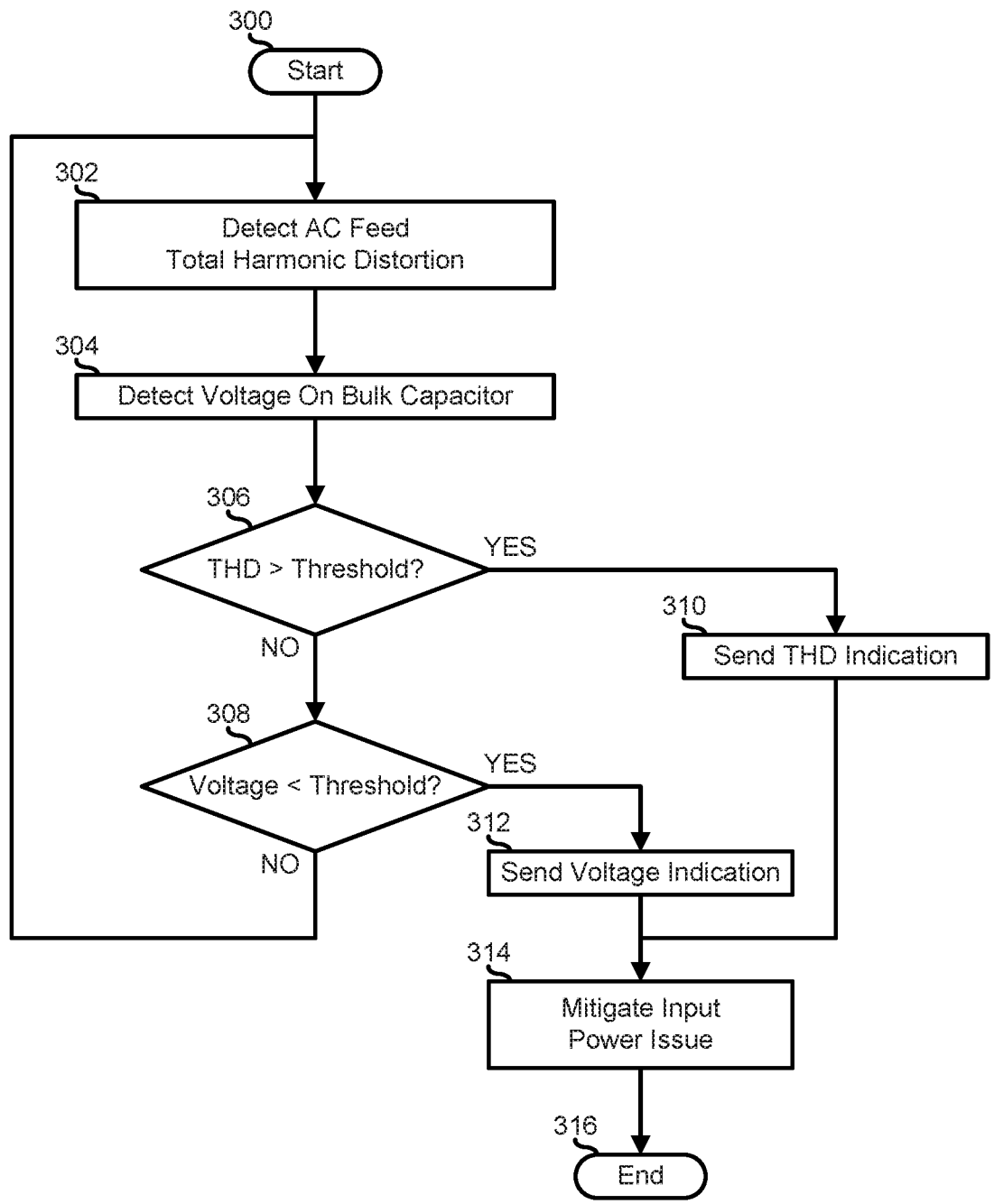
FIG. 3 is a flowchart illustrating a method of using input power line telemetry in an information handling system according to an embodiment of the present disclosure.

FIG. 3 illustrates a method of using power line input telemetry in an information handling system, starting at block 300. A PSU with a power monitor module detects the THD on the AC feed to the PSU in block 302, and determines the voltage level on a bulk capacitor of the PSU in block 304. A decision is made as to whether or not the detected THD exceeds a THD threshold in decision block 306. For example, the detected THD can exceed a first THD threshold, indicating that the THD is at an alert level, the detected THD can exceed a second THD threshold, indicating that the THD is at a warning level, or the detected THD can exceed a third THD threshold, indicating that the THD is at a critical level.

If the THD does not exceed a THD threshold, the "NO" branch of decision block 306 is taken, and a decision is made as to whether or not the detected voltage on the bulk capacitor is lower than a voltage threshold in decision block 306. For example, the detected voltage can be less than a first voltage threshold, indicating that the voltage is at an alert level, the detected voltage can exceed a second voltage threshold, indicating that the voltage is at a warning level, or the detected voltage can exceed a third voltage threshold, indicating that the voltage is at a critical level. If the detected voltage on the bulk capacitor is not lower than a voltage threshold, the "NO" branch of decision block 306 is taken and the method returns to block 302, where the PSU detects the THD on the AC feed.

Returning to decision block 306, if the detected THD exceeds a THD threshold, the "YES" branch is taken, and the power monitor module sends a THD indication to a BMC of the information handling system in block 310. For example, when the detected THD exceeds the first THD threshold, the power monitor module sends a THD alert indication that the detected THD is at the alert level, when the detected THD exceeds the second THD threshold, the power monitor module sends a THD warning indication that the detected THD is at the warning level, or when the detected THD exceeds the third THD threshold, the power monitor module sends a THD critical indication that the detected THD is at the critical level. The method then proceeds to block 314, as described below.

Returning to decision block 308, if the voltage on the bulk capacitor exceeds a voltage threshold, the "YES" branch is taken, and the power monitor module sends a voltage indication to the BMC in block 312. For example, when the detected voltage is less than the first voltage threshold, the power monitor module sends a voltage alert indication that the detected voltage is at the alert level, when the detected voltage is less than the second voltage threshold, the power monitor module sends a voltage warning indication that the detected voltage is at the warning level, or when the detected voltage is less than the third voltage threshold, the power monitor module sends a voltage critical indication that the detected voltage is at the critical level.

After the power monitor module sends the THD indication to the BMC in block 310 or the power monitor module sends the voltage indication to the BMC in block 312, the method then proceeds to block 314, where the BMC mitigates the input power quality issue for the information handling system. For example, the BMC may write to a log maintained by the host environment of the information handling system, to a log maintained by the BMC, or to a log maintained by a management system of a datacenter that includes the information handling system, the BMC may throttle one or more component of the information handling system, the BMC initiate a persistent memory save operation, or the BMC may take other actions as described above. The method ends in block 316.

Figure 4:
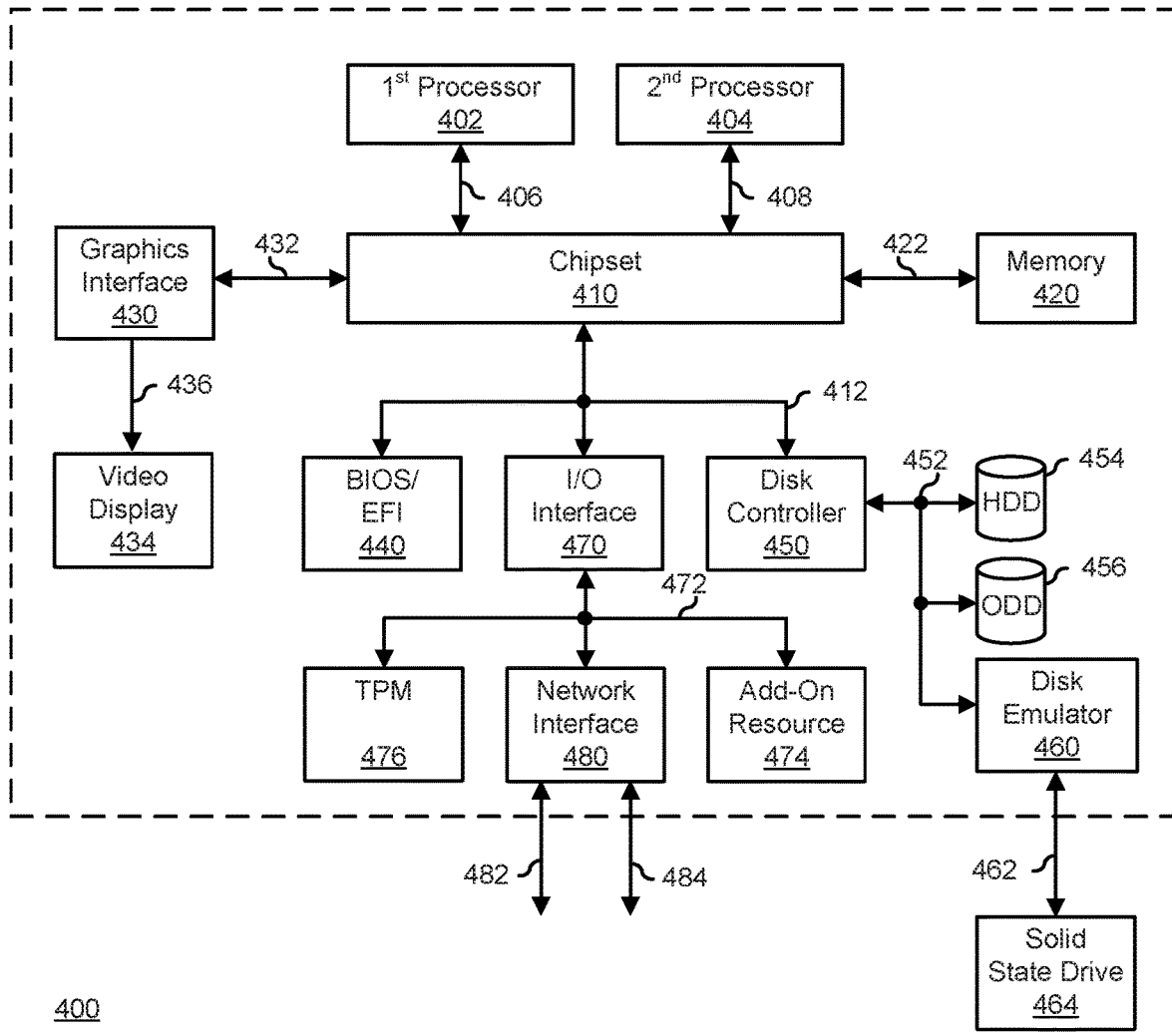
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a power supply including an input power monitor module and a communication interface, wherein the input power monitor module is configured to detect a total harmonic distortion (THD) on a power input to the power supply, to determine that the THD is greater than a first THD threshold, and to provide a first indication that the THD is greater than the first THD threshold on the communication interface; and
a baseboard management controller (BMC) coupled to the communication interface, the BMC configured to receive the first indication and to enter a first item into a log of the information handling system in response to receiving the first indication;
wherein the input power monitor module is further configured to determine that the THD is greater than a second THD threshold, and to provide a second indication that the THD is greater than the second THD threshold on the communication interface, the second THD threshold being greater than the first THD threshold; and
wherein the BMC is further configured to receive the second indication, and to reduce a power consumption level of the information handling system in response to receiving the second indication.

2. The information handling system of claim 1, wherein in reducing the power consumption level, the BMC is further configured to throttle a device of the information handling system.

3. The information handling system of claim 1, wherein in reducing the power consumption level, the BMC is further configured to disable a device of the information handling system.

4. The information handling system of claim 1, further comprising:
a persistent memory device;
wherein the input power monitor module is further configured to determine that the THD is greater than a third THD threshold, and to provide a third indication that the THD is greater than the third THD threshold on the communication interface, the third THD threshold being greater than the second THD threshold; and
wherein the BMC is further configured to receive the third indication, and to initiate a save operation on the persistent memory device in response to receiving the third indication.

5. The information handling system of claim 1, wherein: the input power monitor module is further configured to detect a voltage on a bulk capacitor of the power supply, determine that the voltage is less than a first voltage threshold, and to provide a third indication that the voltage is less than the first voltage threshold on the communication interface; and
the BMC is further configured to receive the third indication, and to enter a second item into the log in response to receiving the third indication.

6. The information handling system of claim 5, wherein:
the input power monitor module is further configured to determine that the voltage is less than a second voltage threshold, and to provide a fourth indication that the voltage is less than the second voltage threshold on the communication interface, the second voltage threshold being less than the first voltage threshold; and
the BMC is further configured to receive the fourth indication, and to reduce a power consumption level of the information handling system in response to receiving the fourth indication.

7. The information handling system of claim 6, wherein in reducing the power consumption level, the BMC is further configured to throttle a device of the information handling system.

8. The information handling system of claim 6, wherein in reducing the power consumption level, the BMC is further configured to disable a device of the information handling system.

9. The information handling system of claim 5, further comprising:
a persistent memory device;
wherein the input power monitor module is further configured to determine that the voltage is less than a third voltage threshold, and to provide a fourth indication that the voltage is less than the third voltage threshold on the communication interface, the third voltage threshold being less than the second voltage threshold; and
wherein the BMC is further configured to receive the fourth indication, and to initiate a save operation on the persistent memory device in response to receiving the fourth indication.

10. A method, comprising:
detecting, by an input power monitor module of a power supply of an information handling system, a total harmonic distortion (THD) on a power input to the power supply;
determining, by the input power monitor module, that the THD is greater than a first THD threshold;
providing, via a communication interface of the input power monitor module, a first indication that the THD is greater than the first THD threshold;
receiving, by a baseboard management controller (BMC) of the information handling system coupled to the communication interface, the first indication;
entering, by the BMC, a first item into a log of the information handling system in response to receiving the first indication;
determining, by the input power monitor module, that the THD is greater than a second THD threshold, the second THD threshold being greater than the first THD threshold;
providing, via the communication interface, a second indication that the THD is greater than the second THD threshold;
receiving, by the BMC, the second indication; and
reducing, by the BMC, a power consumption level of the information handling system in response to receiving the second indication.

11. The method of claim 10, wherein in reducing the power consumption level, the method further comprises at least one of:
  throttling, by the BMC, a device of the information handling system; and
  disabling, by the BMC, the device.

12. The method of claim 10, further comprising:
  determining, by the input power monitor module, that the THD is greater than a third THD threshold, the third THD threshold being greater than the second THD threshold;
  providing, via the communication interface, a third indication that the THD is greater than the third THD threshold;
  receiving, by the BMC, the third indication; and
  initiating, by the BMC, a save operation on a persistent memory device of the information handling system in response to receiving the third indication.

13. The method of claim 10, further comprising:
  detecting, by the input power monitor module, a voltage on a bulk capacitor of the power supply;
  determining, by the input power monitor module, that the voltage is less than a first voltage threshold;
  providing, via the communication interface, a third indication that the voltage is less than the first voltage threshold;
  receiving, by the BMC, the third indication; and
  entering, by the BMC, a second item into the log in response to receiving the third indication.

14. The method of claim 13, wherein:
  determining, by the input power monitor module, that the voltage is less than a second voltage threshold, the second voltage threshold being less than the first voltage threshold;
  providing, by the input power monitor module, a fourth indication that the voltage is less than the second voltage threshold on the communication interface;
  receiving, by the BMC, the fourth indication; and
  reducing, by the BMC, a power consumption level of the information handling system in response to receiving the fourth indication.

15. The method of claim 14, wherein in reducing the power consumption level, the method further comprises at least one of:
  throttling, by the BMC, a device of the information handling system; and
  disabling, by the BMC, the device.

16. The method of claim 13, further comprising:
  determining, by the input power monitor module, that the voltage is less than a third voltage threshold, the third voltage threshold being less than the second voltage threshold;
  providing, via the communication interface, a fourth indication that the voltage is less than the third voltage threshold;
  receiving, by the BMC, the fourth indication; and
  initiating, by the BMC, a save operation on a persistent memory device of the information handling system in response to receiving the fourth indication.

* * * * *